US012014878B2

United States Patent
Ryu et al.

(10) Patent No.: US 12,014,878 B2
(45) Date of Patent: Jun. 18, 2024

(54) CONDUCTIVE PASTE INCLUDING METAL PORTIONS HAVING DIFFERENT MELTING POINTS AND MULTILAYER CERAMIC COMPONENT USING THE SAME

(71) Applicant: SAMSUNG ELECTRO-MECHANICS CO., LTD., Suwon-si (KR)

(72) Inventors: Chung Hyeon Ryu, Suwon-si (KR); Hyo Kyong Seo, Suwon-si (KR); Jun Ho Yun, Suwon-si (KR); Ye Ji Hwang, Suwon-si (KR); Seung Been Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 212 days.

(21) Appl. No.: 17/528,575

(22) Filed: Nov. 17, 2021

(65) Prior Publication Data

US 2023/0055918 A1 Feb. 23, 2023

(30) Foreign Application Priority Data

Aug. 20, 2021 (KR) .......................... 10-2021-0110100

(51) Int. Cl.
*H01G 4/30* (2006.01)
*H01G 2/06* (2006.01)
(Continued)

(52) U.S. Cl.
CPC .............. *H01G 4/30* (2013.01); *H01G 2/065* (2013.01); *H01G 4/008* (2013.01); *H01G 4/012* (2013.01); *H01G 4/12* (2013.01)

(58) Field of Classification Search
CPC .......... H01G 4/30; H01G 2/065; H01G 4/008; H01G 4/012; H01G 4/0085; H01G 4/2325; H01G 4/1209
See application file for complete search history.

(56) References Cited

U.S. PATENT DOCUMENTS

| 2011/0141657 A1* | 6/2011 | Jeon | ..................... H01G 4/2325 |
| | | | 361/321.1 |
| 2013/0148261 A1* | 6/2013 | Kim | ........................ H01B 1/22 |
| | | | 252/514 |

(Continued)

FOREIGN PATENT DOCUMENTS

| CN | 111515385 A | * | 8/2020 | ............ B22F 1/0074 |
| JP | 2011-124571 A | | 6/2011 | |

(Continued)

OTHER PUBLICATIONS

Korean Office Action dated Sep. 8, 2023 issued in Korean Patent Application No. 10-2021-0110100 (with English translation).

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A conductive paste includes a core including a first metal and a shell including a second metal having a melting point higher than that of the first metal and enclosing a surface of the core. A multilayer ceramic component includes an external electrode having a sintered electrode layer made of the conductive paste.

15 Claims, 5 Drawing Sheets

(51) Int. Cl.
*H01G 4/008* (2006.01)
*H01G 4/012* (2006.01)
*H01G 4/12* (2006.01)

(56) References Cited

U.S. PATENT DOCUMENTS

| | | | |
|---|---|---|---|
| 2014/0049874 A1* | 2/2014 | Lee | H01G 4/2325 361/321.1 |
| 2014/0063684 A1 | 3/2014 | Lee et al. | |
| 2017/0216914 A1* | 8/2017 | Ohnishi | B22F 1/142 |
| 2019/0277794 A1 | 9/2019 | Yu et al. | |
| 2020/0082984 A1* | 3/2020 | Kim | H01G 4/2325 |
| 2022/0406527 A1* | 12/2022 | Hirai | H01G 4/012 |
| 2023/0162916 A1* | 5/2023 | Hirai | H01G 4/012 361/301.4 |

FOREIGN PATENT DOCUMENTS

KR 10-2014-0030611 A 3/2014
KR 10-2019-0106177 A 9/2019

\* cited by examiner

CONDUCTIVE PASTE INCLUDING METAL PORTIONS HAVING DIFFERENT MELTING POINTS AND MULTILAYER CERAMIC COMPONENT USING THE SAME

CROSS-REFERENCE TO RELATED APPLICATION(S)

This application claims benefit of priority to Korean Patent Application No. 10-2021-0110100 filed on Aug. 20, 2021 in the Korean Intellectual Property Office, the disclosure of which is incorporated herein by reference in its entirety.

TECHNICAL FIELD

The present disclosure relates to a conductive paste and a multilayer ceramic component using the same.

BACKGROUND

A multilayer capacitor has been used in various electronic devices due to the small size and high capacity thereof.

To manufacture a multilayer capacitor, an internal electrode printed film may be formed using a conductive paste on a ceramic green sheet, and a plurality of ceramic green sheets may be stacked, thereby preparing a laminate.

Thereafter, a conductive paste may be applied to the laminate and may be sintered to form a sintered electrode layer, and a plating process may be performed on the sintered electrode layer to form an external electrode working as a terminal.

The conductive paste may be used to form an external electrode on a multilayer capacitor.

As described above, as the multilayer capacitor is manufactured through a plurality of processes, the production period may be lengthened, and accordingly, it may be necessary to simplify the process to increase productivity.

SUMMARY

An aspect of the present disclosure is to provide a conductive paste and a multilayer ceramic component using the same, which may improve productivity by simplifying a process of forming an external electrode.

According to an aspect of the present disclosure, a conductive paste includes a core formed of a first metal; and a shell formed of a second metal having a melting point higher than that of the first metal, and enclosing a surface of the core.

The first metal is copper (Cu), and the second metal may be nickel (Ni).

In the conductive particle, a diameter of the core may be greater than a thickness of the shell.

In the conductive particle, an average diameter of the core may be 3.5 μm or less.

According to another aspect of the present disclosure, a multilayer ceramic component may include a capacitor body; and a plurality of external electrodes including a plurality of sintered electrode layers disposed on the capacitor body and spaced apart from each other, respectively, wherein the sintered electrode layer includes a conductive material, and wherein the conductive material includes a plurality of first metal portions formed of a first metal, and a second metal portion formed of a second metal having a melting point higher than that of the first metal, surrounding the plurality of first metal portions and connected thereto.

The first metal may be copper (Cu) and the second metal may be nickel (Ni).

In the conductive material, a diameter of the first metal portion may be greater than a thickness of the second metal portion.

In the conductive material, a diameter of the first metal portion may be 3.5 μm or less.

The external electrode may include a plating layer formed on the sintered electrode layer, and the plating layer may include tin (Sn).

The plating layer may be disposed to be in direct contact with the sintered electrode layer.

The capacitor body may include a plurality of dielectric layers and a plurality of first and second internal electrodes alternately disposed with the dielectric layers interposed therebetween.

The capacitor body may include first and second surfaces opposing each other, and third and fourth surfaces connected to the first and second surfaces and opposing each other, the sintered electrode layer may include first and second sintered electrode layers connected to the first and second internal electrodes, respectively, and the first and second sintered electrode layers may include first and second connection portions disposed on third and fourth surfaces of the capacitor body, respectively; and first and second band portions extending from the first and second connection portions to a portion of the first surface of the capacitor body, respectively.

The sintered electrode layer may further include glass in which the plurality of first metal portions are dispersed.

One or more of the plurality of first metal portions may be spaced apart from the glass by the second metal portion.

The sintered electrode layer may further include a plurality of third metal portions including the second metal and spaced apart from the plurality of the plurality of first metal portions.

An average diameter of the plurality of first metal portions is 3.5 μm or less.

According to another aspect of the present disclosure, a multilayer ceramic component may include a capacitor body in which an internal electrode is disposed; and an external electrode including a sintered electrode layers disposed on the capacitor body and connected to the internal electrode, and a tin (Sn) plating layer disposed directly on the sintered electrode layer. The sintered electrode layer may include a conductive material, and the conductive material may include a plurality of first metal portions comprising a first metal and a second metal portion comprising a second metal having a melting point higher than that of the first metal.

An average diameter of the plurality of first metal portions may be 3.5 μm or less.

The first metal may include copper (Cu), and the second metal may include nickel (Ni).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
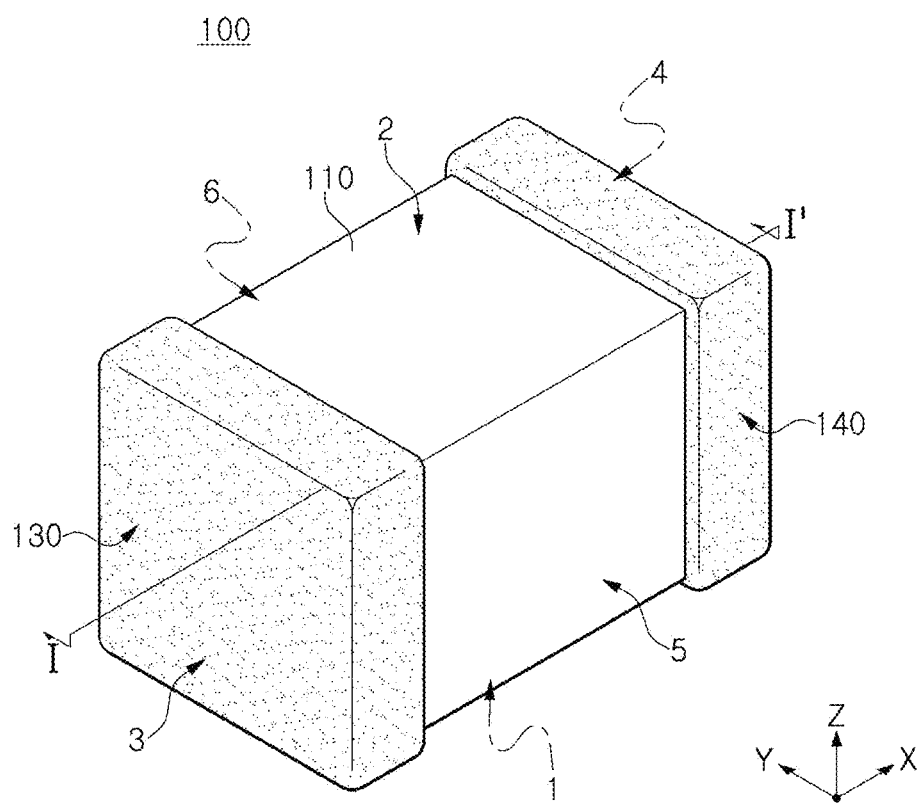
FIG. 1 is a perspective diagram illustrating a multilayer capacitor according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided such that this disclosure will be thorough and complete, and will fully convey the scope of the disclosure to those skilled in the art.

Shapes and sizes of elements in the drawings may be exaggerated for clarity of description, and elements indicated by the same reference numeral are same elements in the drawings.

Also, it will be understood that when a portion "includes" an element, it may further include another element, not excluding another element, unless otherwise indicated.

Figure 2:
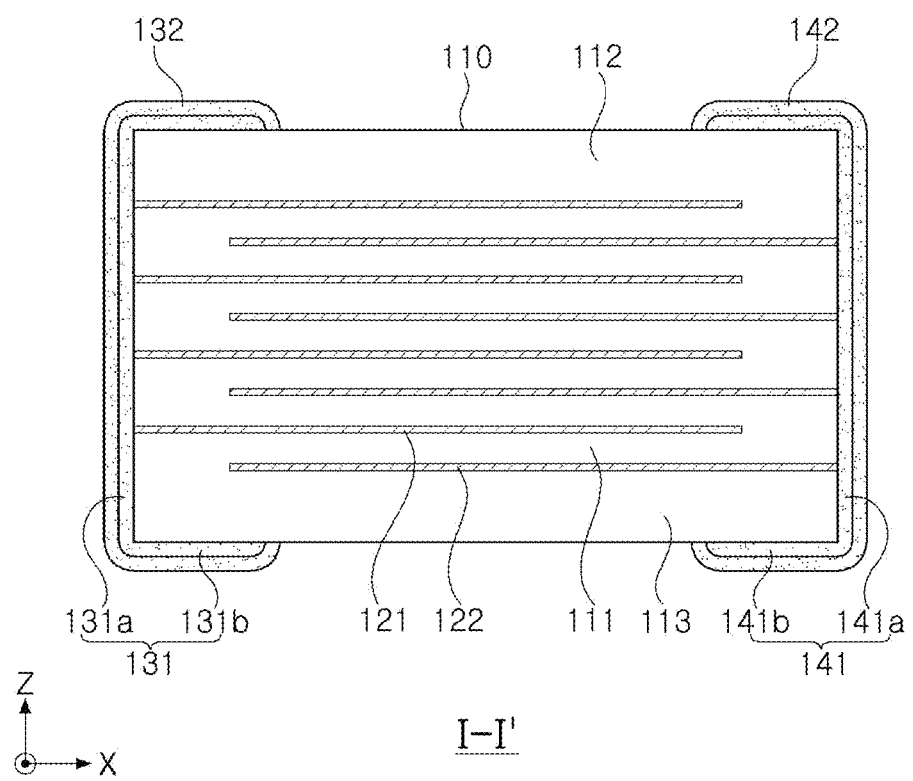
FIG. 2 is a cross-sectional diagram taken along line I-I' in FIG. 1.

FIG. 1 is a perspective diagram illustrating a multilayer capacitor according to an example embodiment. FIG. 2 is a cross-sectional diagram taken along line I-I' in FIG. 1.

As for the direction of a capacitor body 110, X, Y, and Z in the drawings represent a length direction, a width direction, and a thickness direction of the capacitor body 110, respectively. Also, the thickness direction may be used as the lamination direction in which the dielectric layers are laminated.

Referring to FIGS. 1 and 2, a multilayer capacitor 100 according to an example embodiment may include a capacitor body 110 and first and second external electrodes 130 and 140 disposed on both ends of the capacitor body 110 in the X direction.

The capacitor body 110 may be formed by stacking a plurality of dielectric layers 111 in the Z direction and baking the dielectric layers, and may include the plurality of dielectric layers 111 and first and second internal electrodes 121 and 122 alternately disposed in the Z direction with the dielectric layer 111 therebetween.

The covers 112 and 113 having a predetermined thickness and working as a margin portion may be formed on both sides of the capacitor body 110 in the Z direction.

In this case, the dielectric layers 111 of the capacitor body 110 adjacent to each other may be integrated such that a boundary therebetween may not be distinct.

The capacitor body 110 may have a substantially hexahedral shape, but an example embodiment thereof is not limited thereto.

In the example embodiment, both surfaces of the capacitor body 110 opposing each other in the Z direction may be defined as first and second surfaces 1 and 2, both surfaces connected to the first and second surfaces 1 and 2 and opposing each other in the X direction may be defined as third and fourth surfaces 3 and 4, and both surfaces connected to the first and second surfaces 1 and 2 and the third and fourth surfaces 3 and 4 and opposing each other in the Y direction may be defined as fifth and sixth surfaces 5 and 6.

The dielectric layers 111 may include a high-k ceramic material, and may include barium titanate ($BaTiO_3$) ceramic powder, for example, but an example embodiment thereof is not limited thereto.

The dielectric layers 111 may further include ceramic additives, organic solvents, plasticizers, binders, and dispersants in addition to ceramic powder.

The ceramic additives may include at least one of a transition metal oxide, a transition metal carbide, a rare earth element, magnesium (Mg) or aluminum (Al).

Figure 3:
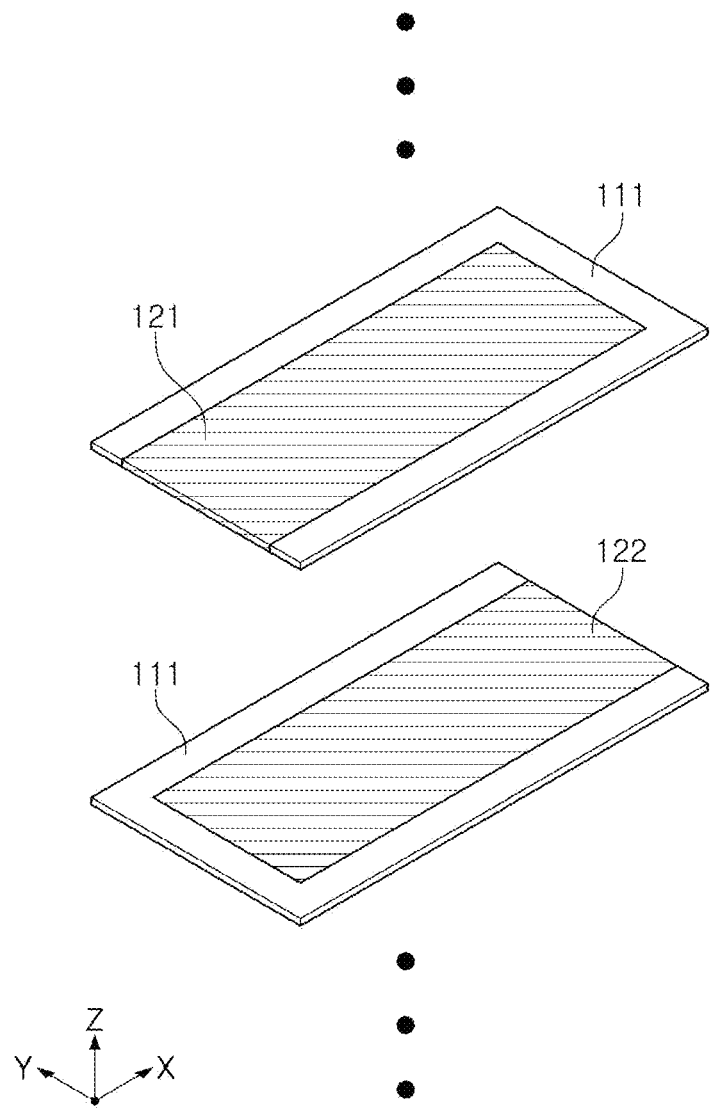
FIG. 3 is a perspective diagram illustrating a laminate structure of first and second internal electrodes in a multilayer capacitor according to an example embodiment of the present disclosure.

Referring to FIG. 3, the first and second internal electrodes 121 and 122 may have different polarities, and may be alternately disposed in the Z direction with the dielectric layer 111 interposed therebetween, and one ends thereof may be exposed to (or be in contact with or extend from) the third and fourth surfaces 3 and 4 of the capacitor body 110, respectively.

In this case, the first and second internal electrodes 121 and 122 may be electrically insulated from each other by the dielectric layer 111 disposed therebetween.

Accordingly, the ends of the first and second internal electrodes 121 and 122, alternately exposed through the third and fourth surfaces 3 and 4 of the capacitor body 110, may be electrically connected to the first and second external electrodes 130 and 140 disposed on the third and fourth surfaces 3 and 4 of the capacitor body 110, respectively.

In this case, the first and second internal electrodes 121 and 122 may be formed of a conductive metal, and for example, a material such as nickel (Ni) or a nickel (Ni) alloy may be used, but an example embodiment thereof is not limited thereto.

By the above configuration, when a predetermined voltage is applied to the first and second external electrodes 130 and 140, electrical charges may be accumulated between the first and second internal electrodes 121 and 122 opposing each other.

In this case, capacitance of the multilayer capacitor 100 may be proportional to a region of overlap between the first and second internal electrodes 121 and 122, overlapping each other in the Z direction.

The first and second external electrodes 130 and 140 may be disposed on both ends of the capacitor body 110 in the X direction, may be provided with voltages of different polarities, and may be electrically connected to the exposed portions of the first and second internal electrodes 121 and 122, respectively.

The first external electrode 130 may include a first sintered electrode layer 131 in contact with one end of the capacitor body 110 and a first plating layer 132 formed on the first sintered electrode layer 131.

The first sintered electrode layer 131 may include a first connection portion 131a and a first band portion 131b.

The first connection portion 131a may be formed on the third surface 3 of the capacitor body 110 and may be connected to the first internal electrode 121, and the first band portion 131b may extend from the first connection portion 131a to a portion of the first surface 1, which may be the mounting surface of the capacitor body 110.

In this case, the first band portion 131b may further extend to a portion of the fifth and sixth surfaces 5 and 6 of the capacitor body 110 to improve fastening strength, if desired.

Also, the first band portion 131b may further extend to a portion of the second surface 2 of the capacitor body 110 if desired.

The second external electrode 140 may include a second sintered electrode layer 141 in contact with the other end of the capacitor body 110 and a second plating layer 142 formed on the second sintered electrode layer 141.

The second sintered electrode layer 141 may include a second connection portion 141a and a second band portion 141b.

The second connection portion 141a may be formed on the fourth surface 4 of the capacitor body 110 and may be connected to the second internal electrode 122, and the second band portion 141b may extend from the second connection portion 141a to the first surface 1, which may be the mounting surface of the capacitor body 110.

In this case, the second band portion 141b may further extend to a portion of the fifth and sixth surfaces 5 and 6 of the capacitor body 110 to improve fastening strength, if desired.

Also, the second band portion 141b may further extend to a portion of the second surface 2 of the capacitor body 110 if desired.

The first and second sintered electrode layers 131 and 141 may include a conductive material, and the conductive material may include a plurality of first metal portions formed of a first metal and a second metal portion formed of a second metal having a melting point higher than that of the first metal, surrounding the plurality of first metal portions, and connected thereto.

Also, the first and second sintered electrode layers 131 and 141 may be formed by coating a conductive paste for external electrodes on both ends of the capacitor body 110 in the X direction and baking the conductive paste.

Figure 4:
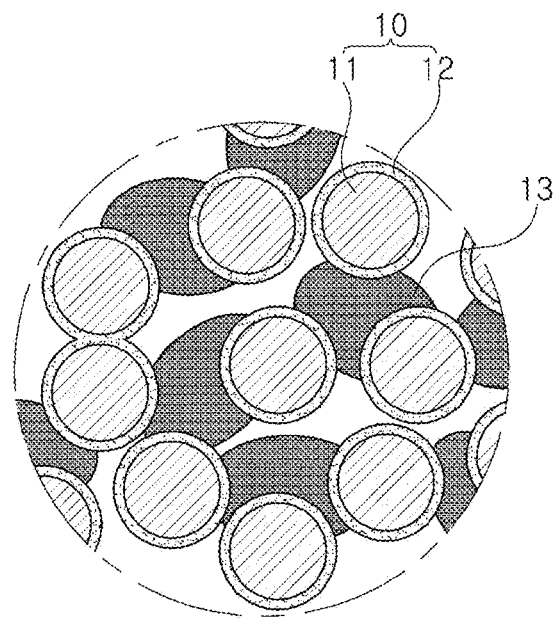
FIG. 4 is a diagram illustrating a structure of a conductive paste for an external electrode before baking.

Referring to FIG. 4, the conductive paste for an external electrode may include a plurality of conductive particles 10 and glass frit 13.

The conductive particles 10 may include a core 11 and a shell 12 surrounding a surface of the core 11.

In this case, the core 11 may be formed of a first metal, and the shell 12 may be formed of a second metal having a melting point higher than that of the first metal.

Preferably, the first metal may be fine copper (Cu), and the second metal may be nickel (Ni).

Also, in the conductive particles 10, a diameter of the core 11 may be greater than a thickness of the shell 12.

Also, in the conductive particles 10, a diameter of the core 11 may be 3.5 μm or less.

Figure 5:
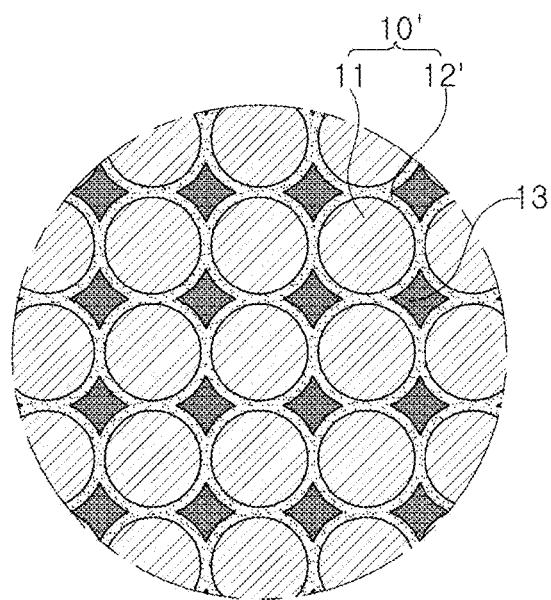
FIG. 5 is a diagram illustrating a structure of a sintered electrode layer of an external electrode after baking.

FIG. 5 is a diagram illustrating a structure of a sintered electrode layer of an external electrode after baking.

As illustrated in FIG. 5, when the baking is performed, the conductive particles 10 individually separated before the baking may become a conductive material 10' in which the conductive particles 10 are connected to each other.

This is because necking in which the shells 12 of the conductive particles 10 adjacent to each other are in contact with each other may occur after the baking, such that the second metal portion 12' in which the shells are connected to each other may be formed.

In this case, the plurality of cores 11 may be present in the second metal portion 12', and the adjacent cores 11 may not be integrated with each other and may be separated from each other.

The plurality of cores 11 may form the first metal portion. Hereinafter, the core and the first metal portion will be described using the same reference numeral.

In this case, the cross-sectional surface of the first metal portion 11 is circular in FIG. 5, but an example embodiment thereof is not limited thereto. The circular shape of the first metal portion 11 may be changed to an oval shape or an uneven shape due to reduction after the baking.

As described above, when the plurality of shells 12 including nickel may be connected to each other and may form the second metal portion 12', and the first metal portion 11 is present in the second metal portion 12', the sintered electrode layer may have intrinsic properties of both copper and nickel. Therefore, it may not be necessary to form a nickel plating layer.

Thus, the external electrode in an example embodiment may be clearly different from a general structure in which a nickel plating layer is formed on a sintered electrode layer formed of copper.

After the baking is performed, the glass frit 13 may be melted and may fill voids between the conductive particles 10, which may contribute to improving moisture resistance.

In this case, as illustrated in FIG. 5, the glass frit 13 may fill the entire voids between the conductive particles 10, but an example embodiment thereof is not limited thereto. A portion of the voids may remain empty without being filled with the glass frit 13.

Also, the first and second plating layers 132 and 142 may be formed on the surfaces of the first and second sintered electrode layers 131 and 141.

The first and second plating layers 132 and 142 may be formed of first and second tin (Sn) plating layers including tin (Sn).

Also, the first and second tin plating layers 132 and 142 may be disposed to be in direct contact with the first and second sintered electrode layers 131 and 141.

Generally, to mount a multilayer capacitor in which a sintered electrode layer is formed of copper (Cu) particles on a board by soldering, first nickel (Ni) may be primarily plated on the sintered electrode layer including copper, and tin (Sn) may be secondarily plated, thereby stably mounting the multilayer capacitor.

In this case, the nickel plating layer may prevent high-temperature heat formed by soldering applied to the tin plating layer from being transferred to the sintered electrode layer.

When the sintered electrode layer is formed using a conductive paste including copper and tin is plated thereon without nickel plating, the sintered electrode layer including copper may be damaged by heat formed by soldering when the multilayer capacitor is mounted on a board, such that lifespan of the multilayer capacitor may be shortened.

However, in an example embodiment, using the conductive paste including conductive particles having a structure of copper cores and nickel shells when forming the sintered electrode layer, the nickel plating process may be omitted and the tin plating process may be performed instantly after the baking electrode layer is formed.

The plating process currently applied may be to coat metal ions supplied from an anode through a barrel process on the sintered electrode layer of the multilayer capacitor, which is a cathode.

That is, the plating in the example embodiment may be a method of forming a plating layer by metal ions adhering to a conductive metal material. Accordingly, in an example embodiment, there may be no significant issue in plating tin regardless of the thickness of the shell, which is nickel, in the structure of copper cores and shells.

In this case, since the nickel component of the second metal portion may protect the copper component forming the first metal portion, which is the core of the conductive material included in the sintered electrode layer, from heat resistance of lead during soldering, the reduction in the lifespan of the multilayer capacitor may be reduced.

When the nickel plating process is omitted when forming the external electrode as described above, the manufacturing time and costs may be reduced by the simplification of the process. Also, according to an example embodiment, since the conductive material included in the sintered electrode layer has a structure in which Cu is coated with Ni, which may be effective to prevent oxidation of Cu.

In general, when a baking electrode layer of an external electrode includes copper and an internal electrode includes nickel, and the particles of the external electrode are relatively larger than the particles of the internal electrode, since the baking temperature of the external electrode is higher, the copper component of the outer electrode may be more diffused to the internal electrode, and defects such as cracks may occur in this process.

However, in an example embodiment, using conductive particles having a structure of copper cores and nickel shells when forming the sintered electrode layer, the metal component of the external electrode may not be diffused toward the internal electrode, such that defects such as cracks described above may be prevented.

Also, in an example embodiment, in the conductive material included in the sintered electrode layer of the external electrode, the thickness of the second metal portion 12' may be smaller than the diameter of the first metal portion 11.

According to an example embodiment, the diameter of the first metal portion 11 may be 3.5 μm or less. The diameter of the first metal portion 11 may be obtained by dividing the multilayer capacitor into four sections with an equal spacing in the Z direction, observing the cross-sectional surface of each section in the range of 30 μm in width and 30 μm in length using an SEM, measuring sizes of the cores on the SEM image, and calculating an average value of the sizes.

In this case, a spherical shape of the first metal portion 11 may be changed to an oval shape by reduction after baking. In this case, the diameter of the first metal portion 11 may be measured in the direction in which the diameter of the core is the longest.

When the diameter of the first metal portion 11 exceeds 3.5 μm, the voids present in the sintered electrode layer may become excessively large.

Also, when density in the external electrode is lowered as described above, it may be highly likely that the plating solution component may permeate into the capacitor body during the plating process for forming the plating layer, and accordingly, internal resistance (IR) deterioration may occur, such that high temperature reliability of the multilayer capacitor may be lowered.

Figure 6:
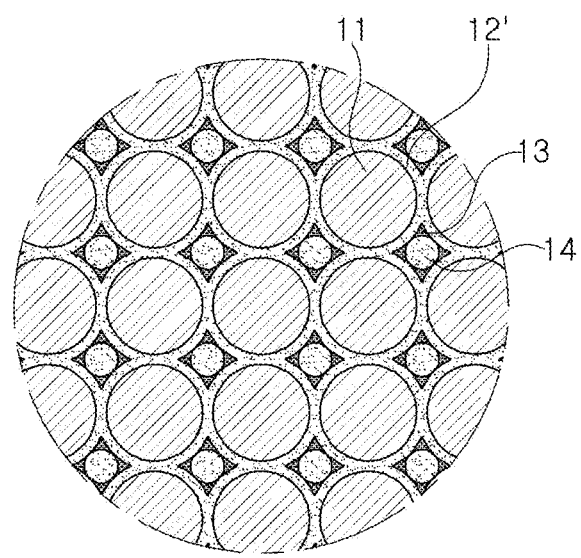
FIG. 6 is a diagram illustrating a structure of a sintered electrode layer of an external electrode according to another example embodiment of the present disclosure.

Referring to FIG. 6, the first and second sintered electrode layers in an example embodiment may further include a third metal portion 14.

The third metal portion 14 may be a portion in which a portion of the shell of conductive particles included in the conductive paste is separated and agglomerated in the process of necking each other after baking.

According to the aforementioned example embodiment, by omitting the nickel (Ni) plating process when the external electrode of the multilayer ceramic component is formed, the manufacturing process may be simplified.

While the example embodiments have been illustrated and described above, it will be apparent to those skilled in the art that modifications and variations could be made without departing from the scope in the example embodiment as defined by the appended claims.

What is claimed is:

1. A conductive paste, comprising:
   a glass;
   a plurality of cores comprising a first metal; and
   a plurality of shells comprising a second metal having a melting point higher than that of the first metal, and respectively enclosing surfaces of the plurality of cores,
   wherein adjacent shells, among the plurality of shells, directly contact each other such that adjacent cores, among the plurality of cores, are spaced apart from each other, and
   wherein at least one shell, among the plurality of shells other than the adjacent shells, directly contacts one of the adjacent shells.

2. The conductive paste of claim 1, wherein the first metal is copper (Cu), and the second metal is nickel (Ni).

3. The conductive paste of claim 1, wherein, in a conductive particle, a diameter of the core is greater than a thickness of the shell.

4. A multilayer ceramic component, comprising:
   a capacitor body; and
   a plurality of external electrodes including a plurality of sintered electrode layers disposed on the capacitor body and spaced apart from each other, respectively,
   wherein each of the plurality of sintered electrode layers includes a conductive material,
   wherein the conductive material includes a plurality of first metal portions comprising a first metal, and a plurality of second metal portions comprising a second metal having a melting point higher than that of the first metal,
   wherein the plurality of second metal portions respectively surround the plurality of first metal portions and are connected thereto,
   wherein adjacent second metal portions, among the plurality of second metal portions, directly contact each other such that adjacent first metal portions, among the plurality of first metal portions, are spaced apart from each other,
   wherein at least one second metal portion, among the plurality of second metal portions other than the adjacent second metal portions, directly contacts one of the adjacent second metal portions, and
   wherein at least one of the plurality of sintered electrode layers further comprises glass in which the plurality of first metal portions are dispersed.

5. The multilayer ceramic component of claim 4, wherein the first metal is copper (Cu) and the second metal is nickel (Ni).

6. The multilayer ceramic component of claim 4, wherein, in the conductive material, a diameter of the plurality of first metal portions is respectively greater than a thickness of the plurality of second metal portions.

7. The multilayer ceramic component of claim 4, wherein, in the conductive material, a diameter of the plurality of first metal portions is 3.5 μm or less.

8. The multilayer ceramic component of claim 4, wherein each of the plurality of external electrodes includes a plating layer disposed on the sintered electrode layer, and the plating layer includes tin (Sn).

9. The multilayer ceramic component of claim 8, wherein the plating layer is disposed to be in direct contact with the sintered electrode layer.

10. The multilayer ceramic component of claim 4, wherein the capacitor body includes a plurality of dielectric layers and a plurality of first and second internal electrodes alternately disposed with the dielectric layers interposed therebetween.

11. The multilayer ceramic component of claim 10, wherein the capacitor body includes first and second surfaces opposing each other, and third and fourth surfaces connected to the first and second surfaces and opposing each other,
wherein the plurality of sintered electrode layers include first and second sintered electrode layers connected to the first and second internal electrodes, respectively, and
wherein the first and second sintered electrode layers include first and second connection portions disposed on the third and fourth surfaces of the capacitor body, respectively; and first and second band portions extending from the first and second connection portions to a portion of the first surface of the capacitor body, respectively.

12. The multilayer ceramic component of claim 4, wherein each of the plurality of sintered electrode layers further comprises glass in which the plurality of first metal portions are dispersed.

13. The multilayer ceramic component of claim 12, wherein one or more of the plurality of first metal portions are spaced apart from the glass by the plurality of second metal portions, respectively.

14. The multilayer ceramic component of claim 4, wherein each of the plurality of sintered electrode layers further comprises a plurality of third metal portions including the second metal and spaced apart from the plurality of first metal portions.

15. The multilayer ceramic component of claim 4, wherein an average diameter of the plurality of first metal portions is 3.5 µm or less.

* * * * *